UNITED STATES PATENT OFFICE.

EMIL COURANT, OF BERLIN, GERMANY.

TRIPLE SALT AND METHOD OF MAKING SAME.

SPECIFICATION forming part of Letters Patent No. 693,378, dated February 18, 1902.

Application filed August 15, 1899. Serial No. 727,297. (No specimens.)

*To all whom it may concern:*

Be it known that I, EMIL COURANT, doctor of philosophy and chemist, a subject of the King of Prussia, Emperor of Germany, residing at Berlin, Germany, have invented certain new and useful Improvements in Triple Salts and Processes of Producing the Same; and I do hereby declare the following to be a full, clear, and exact description of the invention, such as will enable others skilled in the art to which it appertains to make and use the same.

The present invention relates to the production of triple salts containing double cyanids. The double cyanid compounds, such as calcium silver cyanid or barium nickel cyanid, are very unstable compounds. I have discovered that salts may be obtained of a great stability from these compounds when treated in alkaline solution with an acid.

In carrying out my process the silver triple salt, for example, may be made as follows: Pure silver oxid is dissolved in a solution of barium cyanid in such proportions that one molecule of oxid of silver ($Ag_2O$) is reckoned for two molecules of barium cyanid ($2BaCy_2$)— *i. e.*, the proportion of two hundred and thirty-two parts, by weight, of oxid silver for three hundred and seventy-eight parts, by weight, of cyanid of barium in solution—so as to form the soluble body $Ag_2Cy_2BaCy_2BaO$, or hydrate of barium may be added to a solution of the double salt $Ag_2Cy_2BaCy_2$ in proportion of one molecule of the hydrate to one of the double salt. The compound thus formed is treated with an acid, such as hydrochloric acid, whereby the triple salt $Ag_2Cy_2$, $BaCy_2$, $BaCl_2$ is obtained. It is to be observed that the acid is not employed in surplus. An amount of free acid would decompose the compound. It is best to introduce the acid into the liquid from below by means of a pipe. In like manner other triple salts may be produced.

In this specification the term "triple salt containing a double cyanid" is employed to signify a salt consisting of a combination of a cyanid of an alkaline metal or alkaline-earth metal (such as barium, &c.) with the cyanid of another metal and with a salt (other than cyanid) of the said alkaline metal or alkaline-earth metal. Such salt combination consists, therefore, of three salts—namely, of two cyanids and of a salt other than cyanid. Such triple-salts may practically be used as electrolytes for the purpose of electrolytically precipitating the metal contained in one cyanid of the triple-salt combination. If, for example, it is intended to precipitate copper upon another metallic article, (such as a zinc article,) a solution containing, perhaps, three to ten per cent. of the copper triple salts ($Cu_2Cy_2 4KCyK_2SO_3$) is employed as the electrolyte, using an anode of metallic copper and the zinc article as cathode. Since such triple salts are stable, they can be previously manufactured or stored.

In the following claims I use the expression "metal of the alkaline groups" to mean an alkaline metal or an alkaline-earth metal.

I claim as my invention—

1. As a new article of manufacture a triple salt containing a double cyanid and consisting of a combination of a cyanid of a metal of the alkaline groups with a cyanid of another metal and a salt, other than cyanid, of the said metal of the alkaline groups, substantially as described.

2. The process herein described of producing a triple salt with a double cyanid, said process consisting in causing a metal oxid to react with cyanids of a metal of the alkaline groups and subjecting the product to the action of an acid, substantially as described.

In testimony whereof I affix my signature in presence of two witnesses.

EMIL COURANT.

Witnesses:
MAX. C. STÄHLER,
HENRY HASPER.